UNITED STATES PATENT OFFICE.

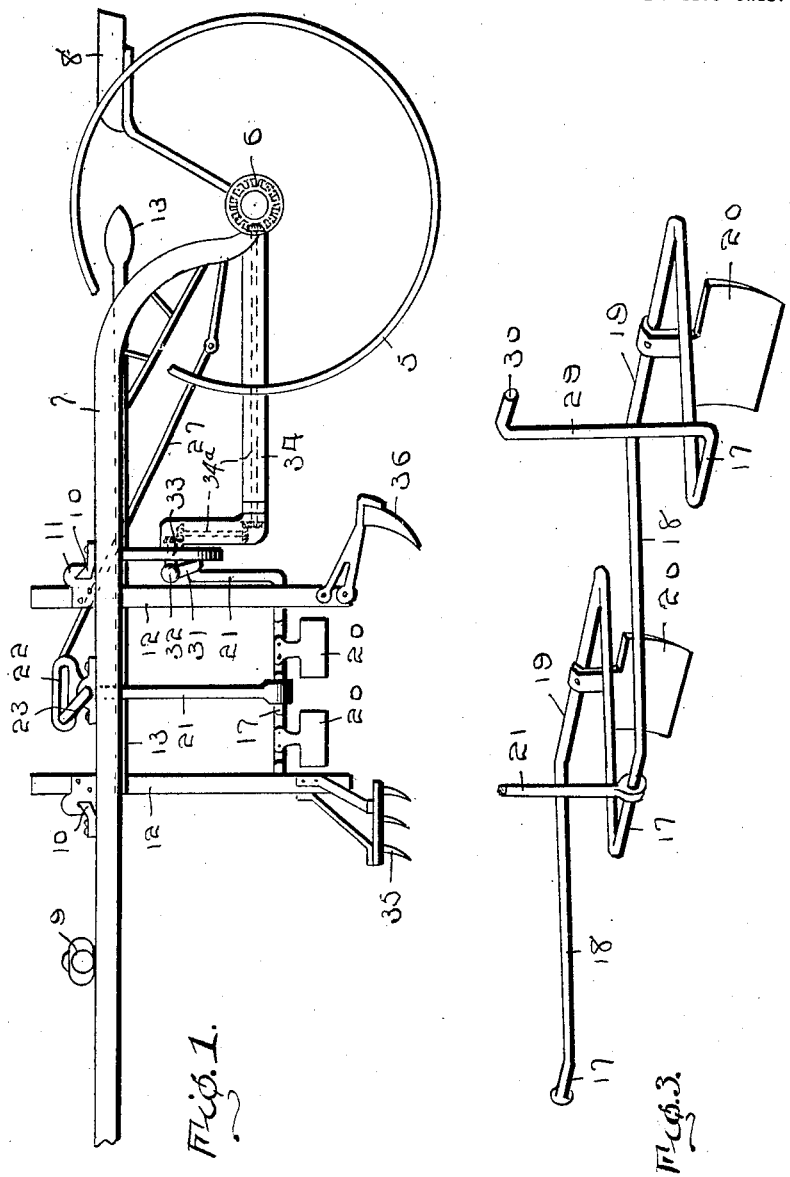

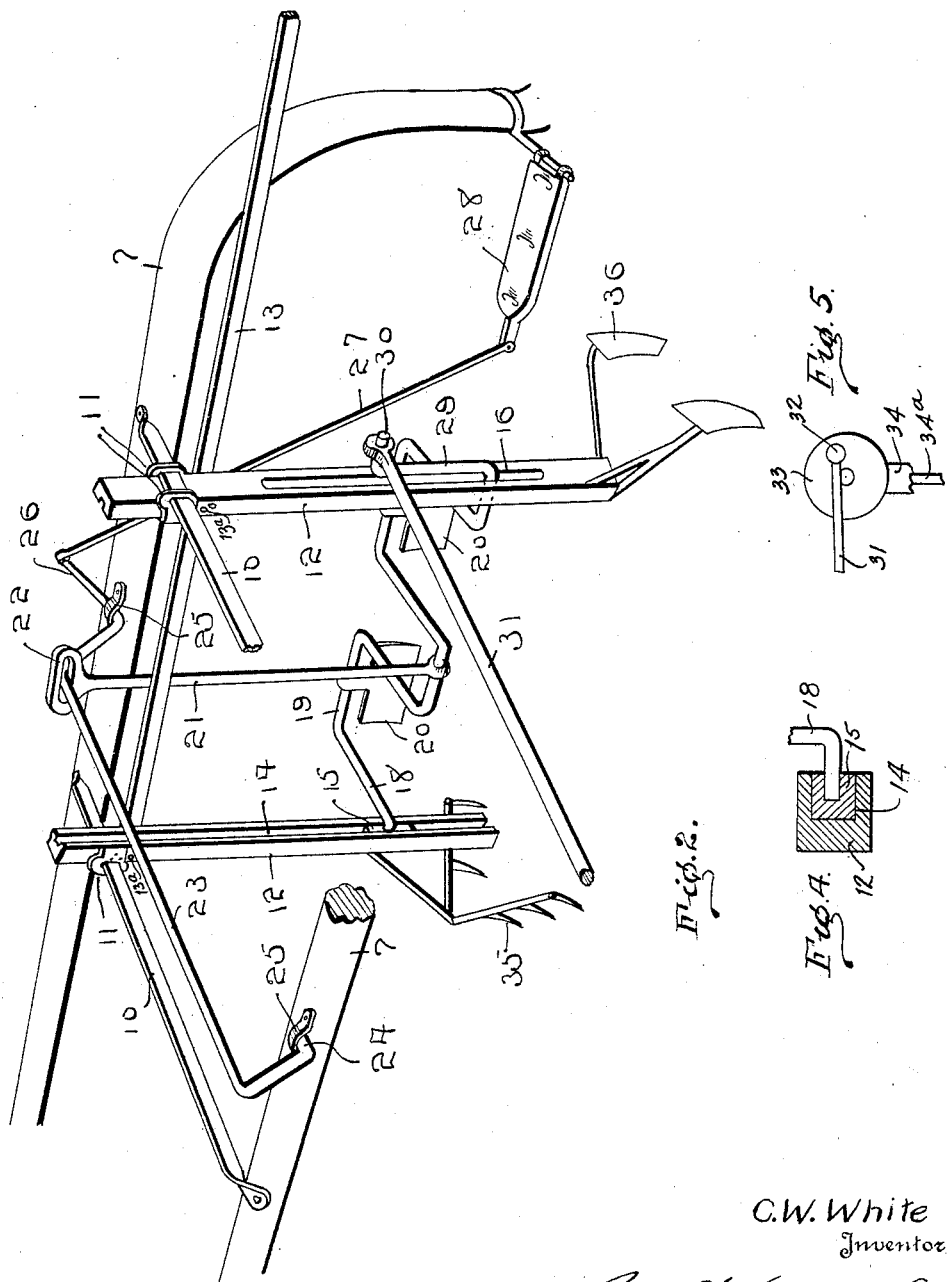

CHARLES W. WHITE, OF CHAMBLEE, GEORGIA.

COTTON-CHOPPER.

1,380,281.  Specification of Letters Patent.  Patented May 31, 1921.

Application filed September 3, 1919. Serial No. 321,398.

*To all whom it may concern:*

Be it known that I, CHARLES W. WHITE, a citizen of the United States, residing at Chamblee, in the county of Dekalb and State of Georgia, have invented certain new and useful Improvements in Cotton-Choppers, of which the following is a specification.

This invention relates to improvements in cotton choppers and has for its primary object to provide an improved machine of this character embodying conveniently accessible and operable means for effecting vertical and horizontal adjustment of the chopping mechanism.

Another object is the provision of a cotton chopper in which the chopping mechanism is mounted for vertical adjustment in a pair of uprights movable longitudinally upon guide rods mounted in a suitable wheel mounted frame structure whereby the construction of the machine is simplified and the adjustment of the respective parts thereof rendered convenient.

With these and other objects in view as will appear as the description proceeds the invention comprises the novel features of construction combination of elements and arrangement of parts which will be more fully described in the following specification and set forth with particularity in the claims appended hereto.

Figure 1 presents a fragmentary side elevation of the improved cotton chopper.

Fig. 2 represents a fragmentary perspective view of the cotton chopping mechanism and the supporting and adjusting means therefor.

Fig. 3 represents a perspective view of the crank shaft supporting the cotton chopping elements.

Fig. 4 represents an enlarged detail sectional view through one of the uprights and the adjustable bearing member for one end of the chopper shaft, and, Fig. 5 is a front elevation, partly broken away, illustrating the connection between the pitman and drive disks therefor.

Referring to the drawing in detail, wherein similar reference numerals designate corresponding parts throughout the several views, the numeral 5 indicates one of a pair of supporting wheels carried by the axle housing 6 which latter is provided with forwardly extending shafts 7 adapted to be harnessed to a draft animal whereby the cotton chopper is conveyed. A preferred type of operator's seat 8 is attached to the axle 6 and a swingle-tree 9 is connected with the shafts 7 at a point forwardly of the chopping mechanism to be hereinafter more fully described.

At points rearwardly of the swingle-tree 9 the shafts 7 are connected by a pair of parallel supporting and guide rods 10 the terminals of which are twisted and bolted or otherwise rigidly secured to the shafts 7. Supporting brackets 11 are mounted for movement longitudinally of the guide rods 10 and are rigidly secured to vertically disposed uprights or standards 12 which are connected by an arm 13 as indicated at 13ª, the arm being preferably extended rearwardly to a point conveniently near the operator of the cotton chopper for convenience in adjusting the uprights 12 transversely of the machine upon the guide rods 10.

The rear edge of the front upright 12 is provided with a vertical groove 14 receiving a vertically adjustable bearing member 15 while the rear upright 12 is provided with a vertical slot 16. The opposite terminals of a shaft 17 are journaled in the bearing member 15 and in the slot 16 whereby the shaft may be moved vertically in the uprights 12. The shaft 17 is provided with a plurality of crank arms 18 connected by the crank portions 19 carrying the cutting elements 20, which, during oscillation of the shaft engage and sever the stalks of the cotton plants disposed in the path thereof.

The shaft 17 is supported in adjusted position by a vertically disposed rod 21 having a slotted upper terminal 22 receiving an adjusting crank 23 the alined terminals 24 of which are pivotally supported in bearings 25 secured to the opposed shafts 7. The slot 22 of the upper terminal of the rod 21 is elongated horizontally to accommodate swinging movement of the crank 23 so that oscillatory movement of the crank 23 effects vertical movement of the rod 21 and consequently the shaft 17 which is connected with the lower terminal thereof.

At one terminal of the crank 23 a radially projecting arm 26 is formed thereon connected by an inclined rod 27 with a foot pedal 28 located below and in front of the seat 8 so as to be conveniently operable by the operator of the cotton chopper and, if preferred suitable locking means for maintaining the foot pedal in adjusted position may be employed.

The rear terminal of the shaft 17 is provided with a relatively long crank arm 29 the terminal or pin 30 of which is connected with one end of a pitman 31 the opposite terminal of which is pivotally connected at 32 with an eccentrically disposed knuckle carried by the disk 33. Rotary movement is transmitted to the disk 33 from the rear axle 6 by a suitable line of shafting 34ᵃ mounted in the housing 34.

Harrow teeth 35 preferably suspended from the lower terminal of the front upright 12 and the plow blades 36 may, if desired be secured to the lower terminal of the rear upright 12 whereby the ground is worked incident to the movement of the machine thereover.

In operation, during travel of the vehicle, rotary movement is transmitted to the disk 33 and the rotary movement of the eccentrically disposed joint 32 transmits a reciprocating movement to the pitman 31 which causes oscillation of the shaft 17 due to the connection of the rod 21 with the crank arm 29. The crank shaft 17 oscillates in an arc at approximately 90 degrees and the cutting blades 30 moving therewith chop the plants disposed in the path thereof.

What I claim is:

1. In a cotton chopper, a wheel mounted frame structure, guide rods mounted therein, uprights movable horizontally upon the rods and disposed vertically, a horizontally disposed and vertically adjustable shaft journaled in the uprights, cotton chopping means carried by the shaft, a crank journaled in the frame structure, means connecting the crank with the shaft for adjusting the latter vertically, and adjusting means connected with said crank.

2. In a cotton chopper, a wheel mounted frame structure, standards suspended therefrom, cotton chopping means supported in the standards, an adjusting rod connected with the chopping means, an adjusting crank pivotally supported upon the frame structure and connected with the terminal of said rod, and manually operable means for adjusting the crank.

3. In a cotton chopper, a wheel mounted frame structure, uprights suspended from the frame structure, cotton chopping means movably supported by the uprights, an adjusting rod, a bearing carried by the lower terminal of the rod for the cotton chopping means, a crank pivotally supported upon the frame structure and connected with the terminal of the rod for effecting vertical adjustment thereof, and means for manually adjusting the crank.

4. In a cotton chopper, a wheel mounted frame structure, guides carried thereby, uprights slidably mounted on the guides and adapted for movement transversely of the frame structure, cotton chopping means carried by the uprights, an adjusting rod connected with the chopping means, a crank pivotally supported upon the frame structure and pivotally and slidably engaged with the terminal of the rod for adjusting the latter vertically together with the chopping means.

5. In a cotton chopper, a wheel mounted frame structure, guides mounted upon the frame structure, uprights adapted for adjustment on said guides transversely of the frame structure, cotton chopping means operatively supported in the uprights, an adjusting rod rotatably supporting the chopping means, an adjusting crank pivotally and slidably engaged with the upper terminal of the rod for effecting vertical adjustment thereof, said crank being elongated to accommodate adjustment of the rod and uprights transversely of the frame structure, and manually operable means connected with the crank for adjusting the latter.

In testimony whereof, I affix my signature hereto.

CHARLES W. WHITE.